United States Patent
Chercoles Sanchez et al.

(10) Patent No.: US 9,201,747 B2
(45) Date of Patent: Dec. 1, 2015

(54) REAL TIME DATABASE SYSTEM

(75) Inventors: Jose Maria Chercoles Sanchez, Madrid (ES); Roman Ferrando Llopis, Alcobendas (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 219 days.

(21) Appl. No.: 13/990,016

(22) PCT Filed: Nov. 26, 2010

(86) PCT No.: PCT/EP2010/068312
§ 371 (c)(1),
(2), (4) Date: May 28, 2013

(87) PCT Pub. No.: WO2012/069091
PCT Pub. Date: May 31, 2012

(65) Prior Publication Data
US 2013/0254590 A1   Sep. 26, 2013

(51) Int. Cl.
*G06F 11/00* (2006.01)
*G06F 11/20* (2006.01)
*G06F 11/16* (2006.01)
*G06F 17/30* (2006.01)
*G06F 11/14* (2006.01)

(52) U.S. Cl.
CPC ........ *G06F 11/2094* (2013.01); *G06F 11/1662* (2013.01); *G06F 17/30584* (2013.01); *G06F 11/1412* (2013.01)

(58) Field of Classification Search
CPC . G06F 3/065; G06F 11/1662; G06F 11/2094; G06F 17/30212; G06F 17/30215; G06F 17/30575; G06F 17/30584
See application file for complete search history.

(56) References Cited

U.S. PATENT DOCUMENTS

| | | | | |
|---|---|---|---|---|
| 5,761,500 A | * | 6/1998 | Gallant et al. | 1/1 |
| 6,571,351 B1 | * | 5/2003 | Mitaru et al. | 714/6.12 |
| 8,732,517 B1 | * | 5/2014 | Stefani et al. | 714/4.1 |
| 2008/0270729 A1 | * | 10/2008 | Reddy et al. | 711/170 |

(Continued)

OTHER PUBLICATIONS

Kossman et al. "An Evaluation of Alternative Architectures for Transaction Processing in the Cloud" SIGMOD '10, Jun. 6-11, 2010, pp. 579-590.

(Continued)

*Primary Examiner* — Alford Kindred
*Assistant Examiner* — Joseph Kudirka
(74) *Attorney, Agent, or Firm* — Rothwell, Figg, Ernst & Manbeck, P.C.

(57) ABSTRACT

A real time database system configured to store database content with a plurality of data sets, the database content being partitioned in different partitions. The system comprises a plurality of master databases, each master database containing a partition of the database content, each partition being provided on a different physical storage unit and at least one replica database, each replica database containing sub-partitions of the partitions stored in master databases. The system further comprises at least one distributor configured to route a request for a data set to the master database, where the data set to which the request refers to, is provided, and divide each partition into several subpartitions. Additionally, the system comprises at least one replicator, configured to generate a replica of each subpartition, and configured to store each replica on a replica database.

24 Claims, 8 Drawing Sheets

(56) References Cited

U.S. PATENT DOCUMENTS

2011/0153570 A1* 6/2011 Kim .............................. 707/652
2013/0226867 A1* 8/2013 Lee et al. ...................... 707/610

OTHER PUBLICATIONS

Stonebraker et al. "The End of an Architectural Era (It's Time for a Complete Rewrite)" VLDB '07, Sep. 23-28, 2007, 10 pages.
Haerder et al. "Principles of Transaction-Oriented Database Recovery" Computing Surveys, vol. 15, No. 4, Dec. 1983, pp. 287-317.
Kallman et al. "H-Store: A High-Performance, Distributed Main Memory Transaction Processing System" VLDB '08, Aug. 24-30, 2008, 4 pages.
Chang et al. "Bigtable: A Distributed Storage System for Structured Data" OSDI, 2006, 14 pages.
Ousterhout, et al. "The Case for RAMClouds: Scalable High-Performance Storage Entirely in DRAM" SIGOPS Operating Systems Review, Vol. 43, No. 4, Dec. 2009, pp. 92-105.
Hamilton Perspectives—Long tailed workloads and the return of hierarchical stor . . . . , http://webarchive.org/web/2010071202906/ http://perspectives.mvdir . . . , Jul. 9, 2010, 3 pages.
Vieira et al. "Redundant Array of Inexpensive Nodes for DWS" LNCS 4947, 2008, pp. 580-587.
Bernstein et al. "Data Management Issues in Supporting Large-Scale Web Services" XP-002646916, IEEE, 2006, 7 pages.

* cited by examiner

REAL TIME DATABASE SYSTEM

CROSS REFERENCE TO RELATED APPLICATION(S)

This application is a 35 U.S.C. §371 National Phase Entry Application from PCT/EP2010/068312, filed Nov. 26, 2010, designating the United States, the disclosure of which is incorporated herein in its entirety by reference.

TECHNICAL FIELD

The present invention relates to a real time database system configured to store a database content with a plurality of data sets, the database content being partitioned in different partitions. The invention furthermore relates to a method for operating the real time database system.

BACKGROUND

Scalable real time databases are becoming pervasively used in different environments due to requirements originating from telecom and internet environments and due to the performance and scalability rates required by those environments. This trend is even stronger, taking into account that the entire telecommunications networks are being re-architected by standardization groups so that pre-existing telecom network databases are split into two layers, namely the one in charge of implementing real functionality and the one in charge of storing and managing data. These real time databases are expected to achieve a high capacity and scalability. The same trends are applicable to IT environments and late advancements in cloud computing. In the telecom environment the demand on high throughput and minimum latencies can only be achieved by means of in memory databases, meaning databases where data sets are kept in the working memory area.

As a result of previous trends, real time databases are to become pervasive, and as a result of performance and scalability properties required, they must be based on clusters, grids or other scalable architectures.

In any case, and in order to provide the necessary resilience features, several redundant instances are provided, both local and even multiple remote replicas—they are necessary to provide the necessary high availability and geographical redundancy properties. In practice, this can mean a number of four, six or even more replicas in order to widthstand local and remote failures of multiple units and entire sites.

Current solutions, such as those known from Kossmann, Kraska, Loesing: "An Evaluation of Alternative Architectures for Transaction Processing in the Cloud, ACM SIGMOD 10 Proceedings of the 2010 International Conference on Management of Date", are based inter alia on first partitioning data and assigning those data partitions to N individual master databases and finally replicating those partitions, one by one, and in their entirety onto an additional set of N replica database servers, resulting in 2×N servers, 3×N, 4×N servers if resilience against 2, 3 or more simultaneous failures is required.

As a consequence, replica databases are essentially idle, attending only replication of data updates and waiting for a single failure—single and unknown—that will affect a single instance among them. Complementary approaches target specific niches and are complex to implement, none of them addressing the basic problem of the inefficiency, which is having dedicated master and replica databases devoted to the same and equal partitions (see Kossmann et al. mentioned above).

Maintaining such a large number of replicas (1×N, 2×N and so on) implies investment, with operational and general infrastructure costs growing linearly, up to half, two thirds or a higher fraction of computing resources, and increasing when resilience against one to or a higher number of simultaneous failures is needed.

Devoting redundant resources to secondary tasks does not help solving the problem, as the system has to be dimensioned for big traffic even in a faulty state. Even worse, extra capacity is needed for helping in recovery tasks in the partitions replicas, e.g. synchronisation and replica consistency assurance when a failed server is recovering with simultaneous incoming traffic.

Summarizing, the bigger the system, the more partitions are required and the more reliable the system is required to be, the more replicas are required for each partition. All replicas are provided in an idle state waiting for a failure affecting a single and unknown replica and shall be dimensioned for extra tasks during recovery. All these inefficiencies increase quadratically with factors such as simultaneous scalability, number of partition and number of replicas.

Summarizing, telecommunication database systems are based on working memory area storage in order to comply with latency and throughput requirements. The above mentioned idle resources imply very high costs and sub-optimal capacity.

SUMMARY

Accordingly, a need exists to provide a real time database system meeting low latency and high throughput requirements while at the same time requiring little idle physical storage unit space.

This need is met by the features of the independent claims. In the dependent claims, preferred embodiments of the invention are described.

According to a first aspect of the invention, a real time database system configured to store a database content with a plurality of data sets is provided. The database content is partitioned in different partitions and the system comprises a plurality of master databases, each master database containing a partition of the database content, each partition being provided on a different physical storage unit. The database system furthermore comprises at least one replica database, each replica database containing subpartitions of the partitions stored in the master databases. Furthermore, at least one distributor is provided configured to route a request for a data set to the master database where the data set to which the request refers to is provided and configured to divide each partition into several subpartitions. Furthermore, at least one replicator is provided configured to generate a replica of each subpartition and configured to store each replica on a replica database, wherein the at least one replicator stores the replicas of each subpartition in such a way that the replicas of one partition are contained on different physical storage units, on a physical storage unit other than the corresponding partition and on another physical storage unit other than the replicator generating the replica of said one partition. The distributor is configured to route a replication request for a subpartition to the replicator responsible for said subpartition. The present database system allows distributing traffic and replication over a plurality of physical storage units, so as to share load changes among such storage units. In this way, a minimum extra capacity is needed in the storage units. The workload distribution is achieved inter alia by partitioning the database content into different partitions and by further partitioning the partitions into subpartitions. In the present database system the presence of 2×N physical storage units/servers for N master databases and replica databases is not necessary, wherein only N+k, k<N storage units being needed. An effective cluster replication and resilience scenarios are obtained by implementing a distributed database having an N+k redundancy. As a result, just a minor delta capacity is required to support fault resilience.

According to one embodiment, the at least one distributor may be configured to detect a failure of a master database, wherein, when the at least one distributor detects a failure of the master database, it routes requests for data sets contained on the failed master database to the replica databases where the replica of the failed master databases are provided, the replicas of the failed master database becoming the master databases for subpartitions of the failed master database during the failure of the master database. This further helps to share load changes due to failure or recovery. Additional capacity needed for fault resilience scenarios is just proportional to the number of simultaneous failures instead of being proportional to both the number of simultaneous failures and the total system capacity. Furthermore, failures have a reduced impact due to the distribution across available physical storage units in failure or recovery scenarios. Furthermore, recovery times are greatly improved.

The invention furthermore relates to a method for operating a real time database system storing the database content with a plurality of data sets. The method comprises the steps of partitioning the database content into different partitions provided on different master databases, each partition being provided on a different physical storage unit. Furthermore, a request for a data set of the database content is distributed by at least one distributor to the master database where the data set to which the request refers to is provided. Additionally, each partition is divided into several subpartitions by the at least one distributor and a replica of each subpartition is generated by at least one replicator, each replica being stored on a replica database, wherein the replicas of each subpartition are stored in such a way that the replicas of one partition are contained on different physical storage units, on another physical storage unit other than the corresponding partition and on another physical storage unit other than the replicator generating the replica of said one partition. A replication request for a subpartition is routed by the distributor to the replicator responsible for said subpartition.

In one embodiment, a failure of a master database may be detected, wherein, if said failure of the master database is detected, requests for data sets contained on the failed master database are distributed by the at least one distributor to the replicas of the failed master database, the replicas of the failed master database becoming the master database for subpartitions of the failed master database during the failure of the master database.

BRIEF DESCRIPTION OF THE DRAWINGS

The invention will be described in further detail with reference to the accompanying drawings, in which.

DETAILED DESCRIPTION OF THE DRAWINGS

Figure 1:
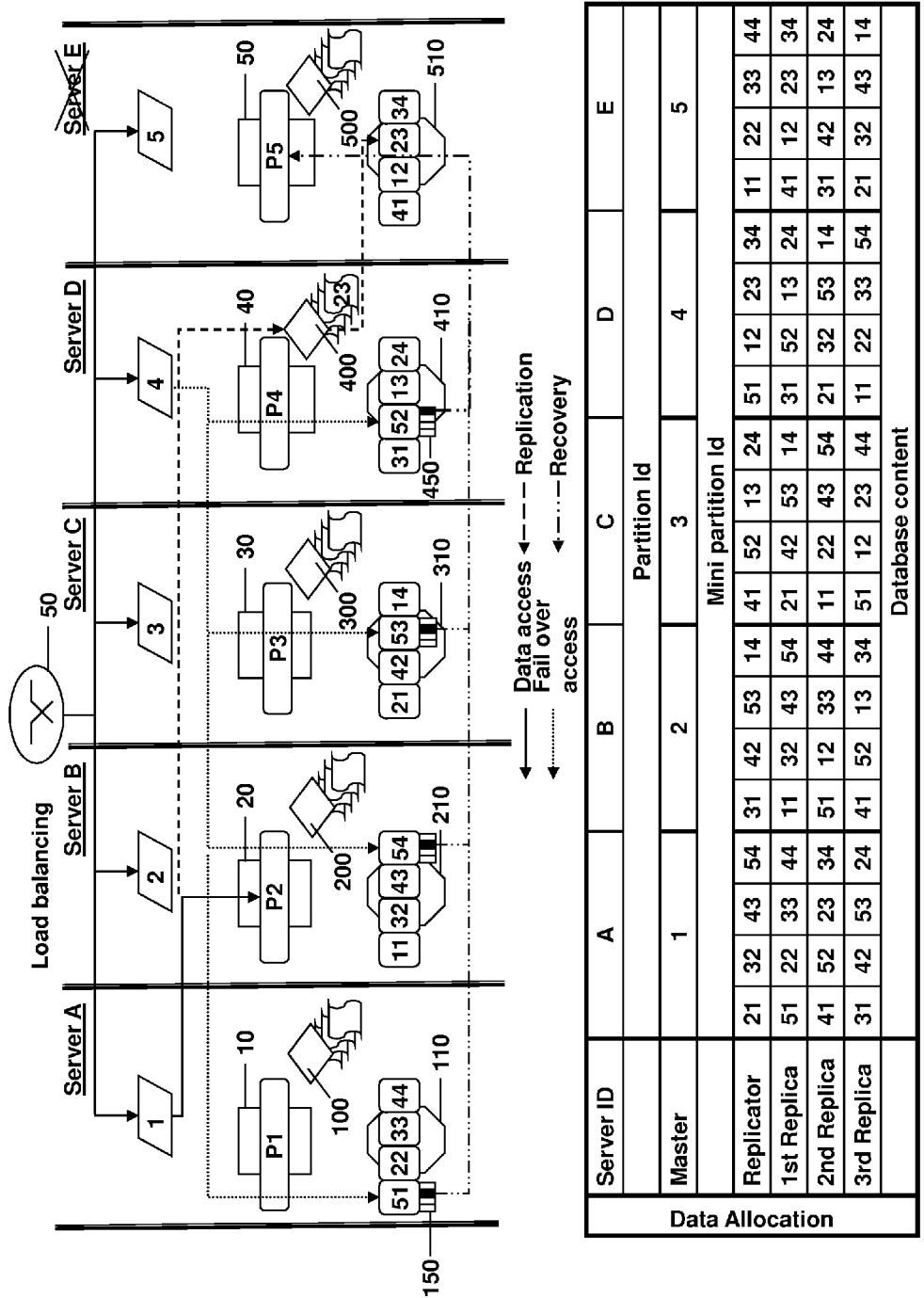
FIG. 1 shows a first embodiment of a real time database system.

In FIG. 1 an embodiment is shown where the data content of a real time database system is distributed to five different physical storage units or servers, called server A to server E in the embodiment shown. The real time database shown in FIG. 1 can, by way of example contain a subscriber registry of a mobile communications network containing the subscriber related information of a subscriber to a mobile communications network.

As shown in FIG. 1 the database content is partitioned into five partitions P1 to P5, each partition P1 to P5 being provided in a corresponding master database 10 to 50. A data request for data contained on the database system is directed to a node 50 from where the request is distributed to one of the distributors 1, 2, 3, 4 or 5, which are configured to route the request for a data set contained on the database system to the master database, where the data set/partition to which the request refers to, is provided. The node 50 may comprise a control unit (not shown) which distributes the request to the different distributors 1 to 5 in dependence on the load of the different distributors or in dependence on a predefined distribution scheme. Each physical storage unit in the embodiment shown in FIG. 1 comprises a replicator, i.e. the replicator 100, 200, 300, 400, 500 in the example shown. The replicator is responsible for the generation of replicas of the subpartitions which are stored on replica databases 110, 210, 310, 410 and 510, respectively. The replicator can take care of the replication flow using standard replication algorithms and operation logs, the replicator monitoring a replica nodes (replica databases) by means of hello protocols or being sensitive to distributed traffic operation results and keeps the distributor updated on the storage unit's health. In addition, it also optimizes operation logs and defines affected data instances as subject to store data on a disk memory area or working memory are in the replica databases 110 to 510, as will be described in further detail with reference to FIG. 6 further below.

The distributors 1 to 5 distribute the input and replication traffic onto the master databases 10 to 50, their replicators 100 to 500 and the replica databases 110 to 510. The distributors have this role in normal and failure situations. Furthermore, the distributors implement data allocation policies and keep track of partition and servers status by means of hello protocols or being sensitive to distributed traffic operation results, then redistributing load upon server failure and recovery.

With the system shown in FIG. 1 it is possible to distribute traffic, fail over replication and recovery and all other meaningful data processes across a plurality of database servers, here the servers A to E (physical storage units), so as to share the load changes due to failure recovery or other events among the different physical data storage units. In this way, just a minimum extra capacity is needed in the different servers for attending those events. The workload distribution is obtained inter alia by partitioning the database content into first partitions P1 to P5. The replicator on each server generates a replica of each partition by generating smaller mini partitions for each partition. By way of example, the replicator generates mini partitions 11, 12, 13, 14 to replicate the content of partition P1, these mini partitions 11 to 14 being stored on server B, server E, server D and server C, respectively. Furthermore, the partition P2 is further partitioned into mini partitions 21 to 24, the partition P3, partitions 31 to 34 etc.

Each mini partition can then be further divided into micro partitions which are shown in the embodiment of FIG. 1 for mini partitions 51 to 54. As will be described in further detail below, the micro partitions are especially used for a recovery process after a failure of one of the master databases 10 to 50.

The allocation of the different partitions and mini partitions to the different physical storage units is visible in FIG. 1 for an homogenous embodiment meaning that all physical storage units implement the same functions having a distributor in charge of distributing input requests, a master database and a replica database in charge of provided data accessing storage and a replicator in charge of logging updates and replicating them onto the corresponding replicas.

The partitioning and distribution is obtained by allocating each partition to a separate physical storage unit. Each partition is then split in mini partitions and the replicas of the mini partitions of such a partition are allocated to still other physical storage units using the hybrid databases different to the database holding the original partition.

In other words, each physical storage unit in the embodiment of FIG. 1 comprises a distributor, a replicator, a master database and a replica database. However, as will be explained in further detail below with reference to FIG. 2, this need not necessarily be the case.

Referring again to FIG. 1 a request flow will be discussed in more detail. First of all, a data request for a data set contained in one of the partitions is balanced onto the available distributors 1 to 5 by node 50, the distribution to one of the physical storage units depending on predefined distribution streams or depending on the load of different distributors. The distributors 1 to 5 then route the individual query or update requests to the physical storage unit hosting the related partition. In the embodiment shown a data request is distributed by distributor 1 to partition 2 contained in server B of FIG. 1. If the operation is an update, the distributor orders as well a replication. This order message is shown by the dashed line from distributor 1 to replicator 400 provided on server D in FIG. 1 that will replicate the update on the affected mini partition, e.g. mini partition 23 in server E of FIG. 1 where the affected replica is allocated.

In case a server fails, here server E of FIG. 1, all distributors, e.g. distributor 4 in the embodiment shown will route all requests to partition P5 to the replicas of P5, the mini partitions 51 to 54 distributed on all the other servers (smaller solid line). Thus, the failure load is shared among the other servers. If a replicator fails (not shown in the Fig.) its replication flow is also shared among the remaining replicators in the other nodes. When a server recovers, server E in the embodiment shown, all servers share the load necessary for such a server recovery. All the other servers simultaneously recover their allocated micro partitions in a sequential manner. The black micro partitions shown in FIG. 1 represent the partitions which are recovered at the same time.

Figure 6:
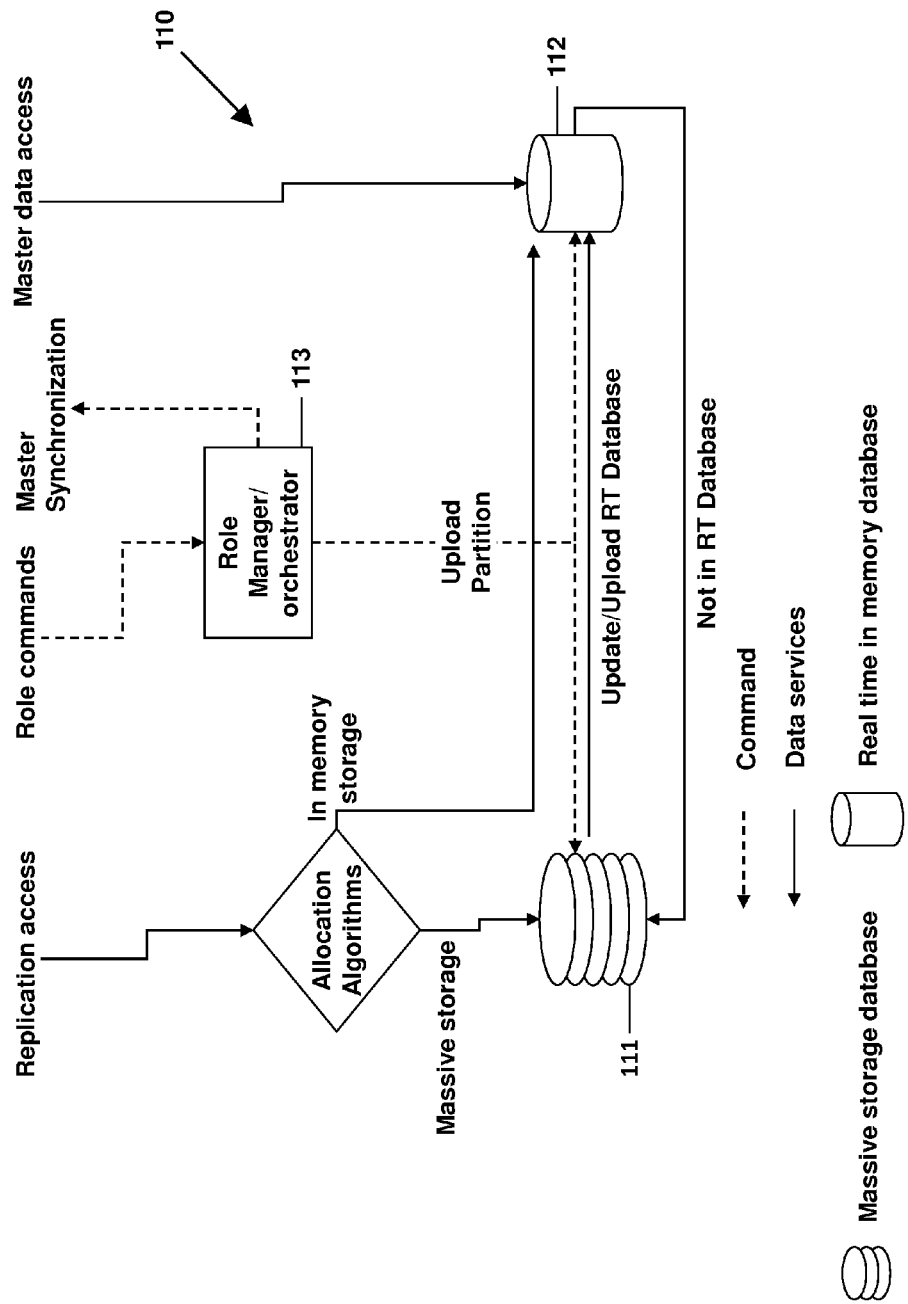
FIG. 6 shows a hybrid database that is used as a replica database to store the replicas.

The replica database being a hybrid storage unit is shown in more detail in FIG. 6 and comprises a disk memory area symbolized by reference numeral 111 and a working memory are 112. In other words the replica database may be a hybrid storage unit containing a working memory area and a disk memory area, the disk memory area containing the replicas, wherein the hybrid database is configured to move the replica of a master database for which a failure has been detected and which becomes the master database for the failed master database from the disk memory area 111 to the working memory area 112 of the hybrid storage unit. In the working memory area a faster access to the data sets is obtained.

Furthermore, the working memory area may contain the data sets of the replicas that are used more often than a predefined threshold, or in other words contains the most often data sets of the replicas. This can mean the data sets that were most frequently updated in a defined time period in the past (e.g. one hour) or data sets with undeniable strict response time requirements even under recovery scenarios. Furthermore, the replica database can be configured to store replicas from a plurality of master databases.

For replicating the data stored on the replica database it is decided by the algorithm shown in the left part whether the replication request is sent to the working memory area 112 or the disk memory area 111.

Furthermore, a role manager 113 may be provided receiving orders from the distributers. By way of example if a message for a failure of a master database is received, the manager orders the upload of the data sets of the failed master database contained in the corresponding replicas of the disk memory area to the working memory area where they can be accessed more easily as these data sets now play the role of the master database.

Referring back to FIG. 1 it can be seen from the lower part of FIG. 1, the given table, that more than one replica of a partition may be generated. In FIG. 1 it can be seen that a mini partition index composed of the partition number followed by the mini partition number inside such a partition can be used. It can be seen as well that even for a 1+1 replication a failure of server E is attended by servers A, B, C and D, respectively, by serving traffic requests or mini partitions 51, 52, 53 and 54. A double failure on two servers can still be attended by the remaining servers if a triple replication (the master database plus replication 1 and replication 2) in the partitioning scheme used in FIG. 1 is implemented. The remaining servers may still hold the mini partitions corresponding to the failed server partitions. As can be seen, a set of replica databases take over the role of a single failed master database, thus reducing the extra computing capacity required on those replica databases. In addition, multiple replicas of the same mini partition can be implemented as shown in the lower part of FIG. 1 where multiple replicas of mini partitions are allocated to the same physical server making the overall system resilient against multiple simultaneous failures.

Figure 2:
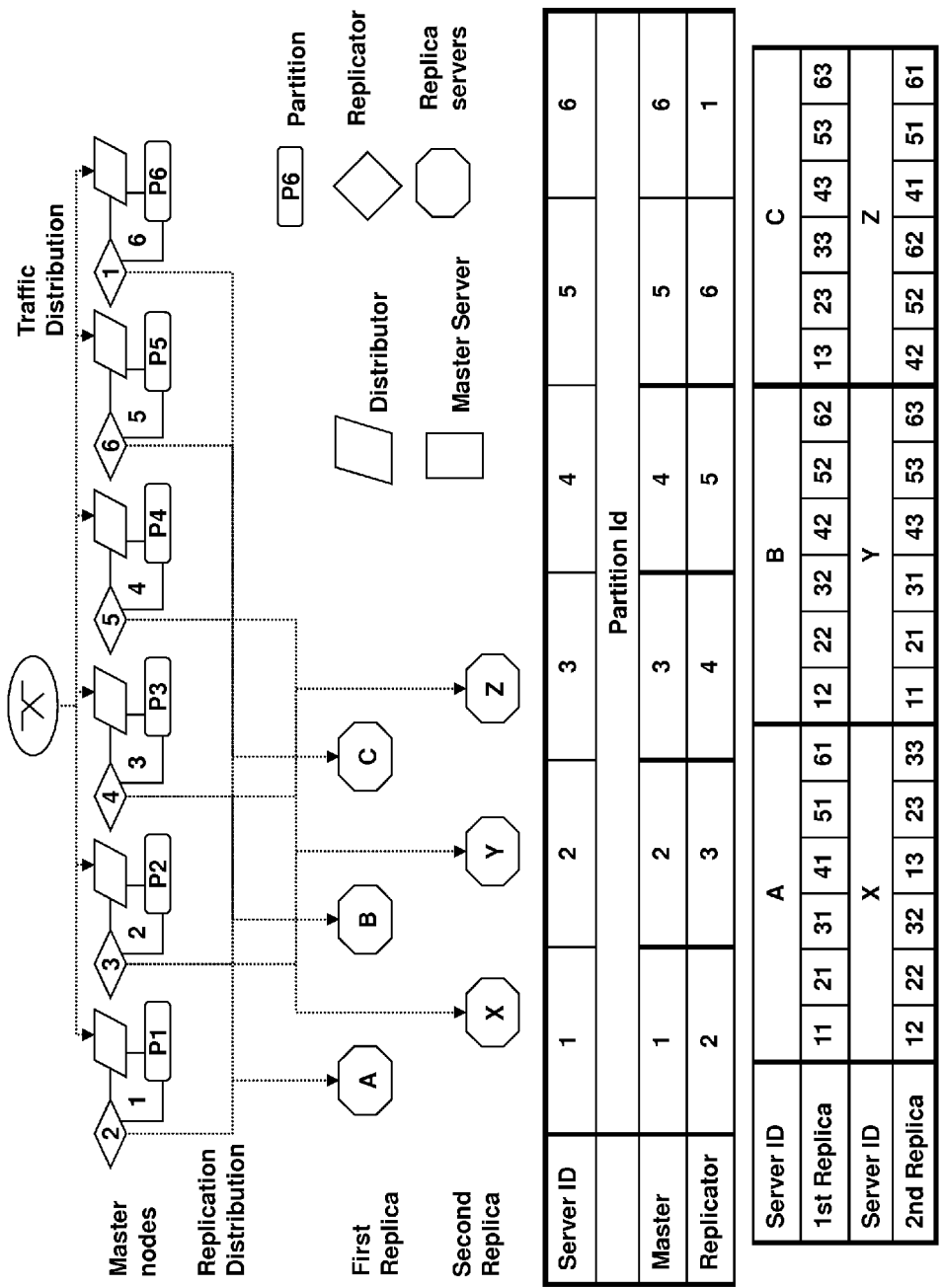
FIG. 2 shows another embodiment of the real time database system with specialized replica servers.

While FIG. 1 shows a homogeneous embodiment in which all roles in the system, such as master database, replica database, replicator and distributor are allocated to all nodes, a heterogeneous embodiment, is also possible in which the system rules are allocated to specialized servers, an example being shown in FIG. 2. In this embodiment specialized double replica databases are shown along with the partitioning scheme applicable in this case. This embodiment clearly shows that it is possible with the present invention to provide N+K replication properties, so that for N servers only a fraction of servers K is required for redundancy purposes. Thus instead of needing 18 servers for the six partitions and for the two replicas of each partition, only 12 physical storage units are needed in the embodiment of FIG. 2, six for the master databases, three for the first replicas and another three for the second replicas.

Each of the N+K nodes of the database system can be implemented using heterogeneous servers/storage units, i.e. N active servers and K failover servers, or a homogeneous embodiment can be used where all servers are equal and share active and failover roles by distributing N+K nodes over physical servers.

In this embodiment each physical storage unit comprises a distributor, a replicator and the master database, the system further comprising specialized physical storage units A-C and X-Z for the replica databases. These replica databases can be again hybrid databases as shown in FIG. 6. As can be seen from the table shown in FIG. 2, the replica database A can contain the mini partitions 11, 21, 31, 41, 51 and 61. Mini partition 12 is provided on the physical storage unit B as a first replica and on the physical storage unit X for the second replica.

In both embodiments the mini partitions can be further divided into micro partitions which were shown in FIG. 1. Micro partitioning, a third level of partitioning, and service distribution applies over the mini partitions discussed above. The micro partition can be used in the recovery process and by the replicator in the following way:

The micro partitions can be defined in the replica databases for recovery purposes, so that multiple replica databases can simultaneously feed a restarted master server, thus reducing the recovery time as shown in FIG. 1 where the micro partitions of mini partition 51, 54, 52 and 53 can be fed to a restarting master database 50 containing partition P5 which restarts after a failure.

The micro partitions can be used as well for the replicator for fail over purposes, so that the replication logs for a mini partition assigned to a failed replicator are distributed onto the remaining replicators, thus sharing the load among them. In the embodiment shown in FIG. 1 the mini partitions are the work allocation unit for the replicators. However, the replicator may also work on any set of micro partitions. This could be the case in FIG. 2 in case the replicator role is allocated to all physical storage units or just to the replica databases so that different groups of micro partitions can be used with the same result.

Micro partitions might be as small as necessary to allow for smooth recovery, thus reducing extra capacity required by recovery processes.

Furthermore, it is possible that the same architecture shown in FIGS. 1 and 2 can be implemented where only micro partitions are considered and managed from a distribution point, so that traffic, failover, recovery and other processes are shared onto multiple physical storage units and replicas by using micro partitions as a distribution mechanism. In general terms this means that only one sub-partition category is generated, i.e. only micro partitions, whereas in the other partitioning schemes two partitioning levels, the sub partitions and smaller partitions of the sub partitions can be used. In this embodiment the sub partitions correspond to the mini partitions, the smaller partitions corresponding to the micro partitions.

This means that the at least one replica database can be configured to further partition the replica on a replica database to smaller partitions, wherein, when the master database restarts after a failure, the replica databases are configured to report the smaller partitions comprising the data sets of the restarted master database needed to recover the partition provided on the restarting master database, to the restarted master database. This corresponds to the use of the mini and micro partitions for replication and recovery purposes, respectively, whereas in another embodiment only micro partitions are used for distribution and recovery purposes.

Summarizing, the distributors distribute input and replication traffic onto master, replicator and replica databases in normal and failure situations. It keeps track of partitions and server status of all three partitioning levels by means of hello protocols, or being sensitive to distributed traffic operation results. The distributor also redistributes the load upon server failure and recovery.

The replicator takes care of the replication flow using replication algorithms and operation logs and monitors replica databases, e.g. by means of hello protocols or by being sensitive to distributed traffic operation results. The replicator keeps the distributor updated on the replica databases' health. Furthermore, it optimizes operation logs and defines affected data instances as subject to storage in the working memory area or disk memory area in the replica databases.

The replica databases are databases that attend traffic upon master database failure. The replica databases receive the update of the corresponding master updates and become the master database temporarily for selected data partitions.

The master database can be the database receiving traffic in the absence of failure.

Figure 3:
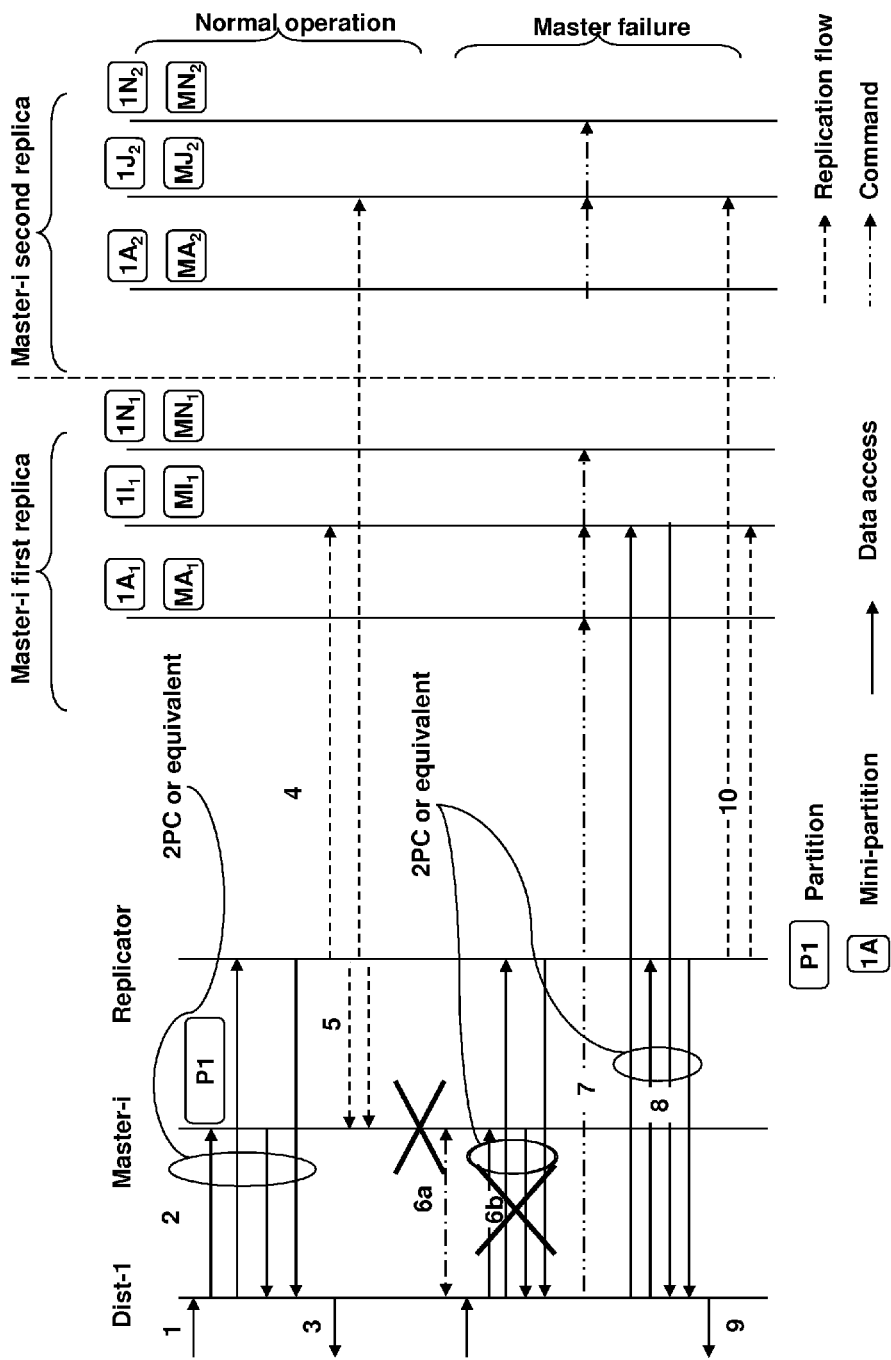
FIG. 3 shows a traffic distribution scenario in a normal operating mode and when a failure of a master database is detected.

In connection with FIG. 3 the traffic distribution for a normal working scenario and for a failure of a master database are shown. In step 1a data access request arrives at the distributor, e.g. distributor 1. This distributor is selected by the node 50 either randomly or based on load sharing. As indicated by step 2 the distributor selects the master and for updates the replicator, both based on the affected data instance, partitioning scheme and current server status. Read operations are answered by the master database, the rest of the scenario applies to updates. The distributor executes a synchronous, e.g. a 2PC or 3PC (two- or three-phase commit) on the master database and replicator, two or three phase commit corresponding to a protocol in which all participating nodes in the distributed system agree to commit a transaction. The same replicator instance is always selected for the same micro partition, and multiple replicators are available for different micro partitions in the same partition. The replicator is aware of the destination replica databases which can be more than one.

In step 3 of FIG. 3 the operation is synchronously operated and a response message is returned back, both the master database and the replicator maintain the operation log for the related data updates.

In step 4 of FIG. 3 the replicator optimizes the operation log, by way of example it may remove overlapping operations on a certain data set or may group several of them and the replicator may finally order the operation against corresponding replicas for affected objects. In step 5 the master database is notified back about the operation success and the master database log is updated.

In this normal operating scenario different failure scenarios are possible: first of all, a master database may fail. In this situation the traffic of the affected partition is distributed among the replica databases containing the mini partitions. These mini partitions may be provided either on the first replica level or on other replica levels.

Furthermore, the master and the first replica database may fail. Here the traffic is directed over the second replica databases. Successive failure of the master and consecutive replica databases are managed in the same way. Furthermore, a replica database may fail or the replicator or distributor node may fail and recover.

In the lower part of FIG. 3 the failure of a master database is discussed in more detail. As shown in step 6 a data access request arrives at the system. The request can be a read request or an update. The distributor has to address a failed node/physical storage unit, either because the monitoring previously informed the distributor of the master database failure (step 6A) or after a failure in executing an update (step 6B).

The failing database is marked as inactive as preparing a recovery process. Further accesses to the affected partition will happen by distributing the previous load onto the replica databases holding the mini partitions included in the failed master database.

In step 7 the distributor commands the first replica levels databases to become the master for the mini partition related to the failed master database. Those replica servers will require operations pending in the affected replicators logs to update the mini partitions to the latest updated status. Furthermore, the replica database will start promoting the replica stored in the disk memory area into the working memory area, this happening for all replica database in parallel. Prompt access to such replicas is allowed by in memory caching on those servers for frequency accessed data.

In case multiple levels of replica databases exist, the master role, the failure, traffic and recovery process can be shared among those multiple levels to further share workload.

In step 8 a new update flow is executed as in the normal mode this time over the new master node for the mini partition where data resides. As mentioned in the previous step in case multiple replica levels exist and the mastership is shared among those, the traffic will be shared among the available replica levels.

In step 9 the operation is synchronously executed and the response is returned back to the entity that was sending the request. In step 10 the operation is replicated over the next replication levels. The master node receives the confirmation of the operation so that the log is cleared.

In general terms in the normal operating scenario for an update of a data set the at least one distributor is configured to order a replication of the update to the replicator that generates the replica of the sub-partition in which the data set to which the update refers to is stored.

Figure 4:
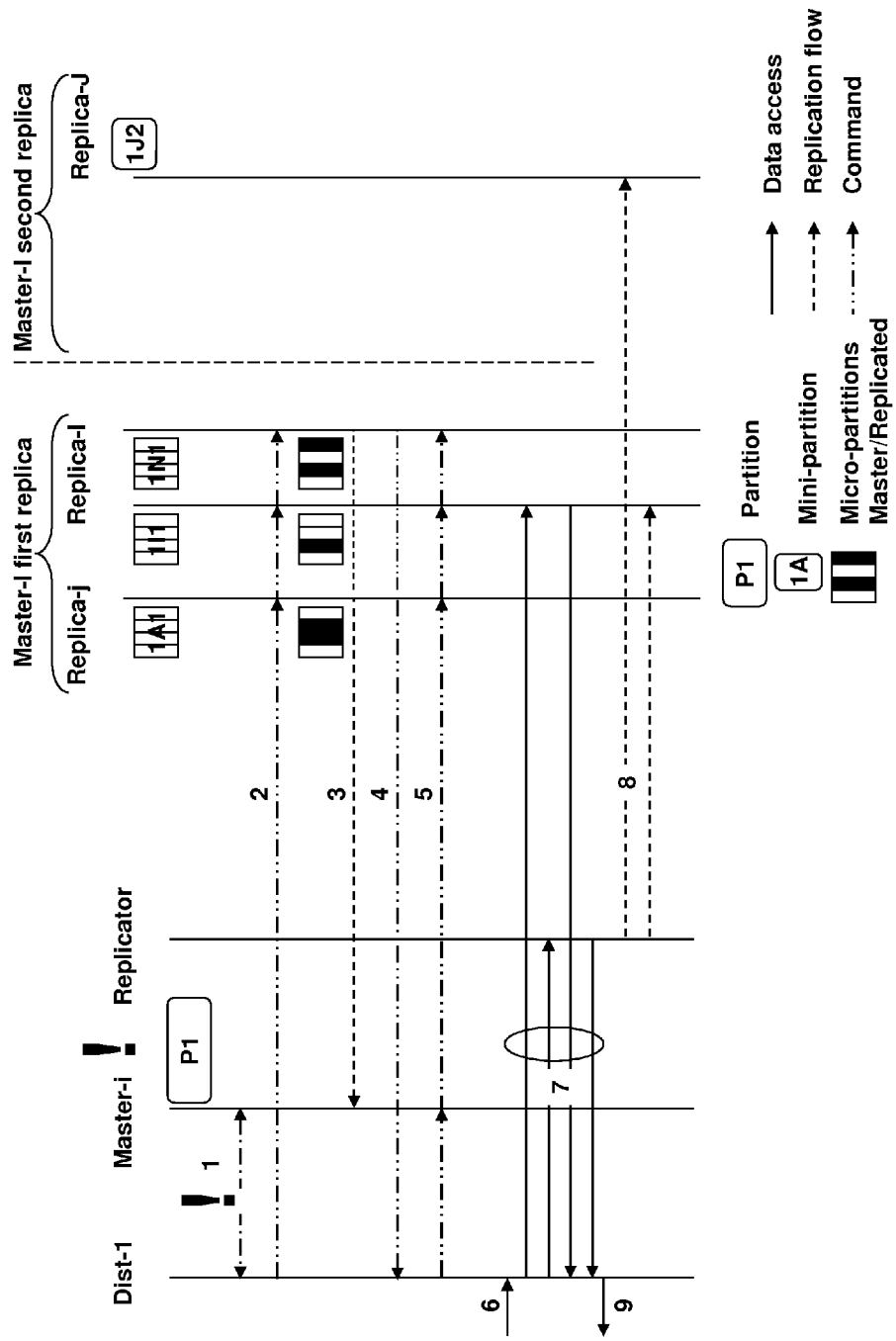
FIG. 4 shows the traffic distribution during a master database recovery after a failure.

In connection with FIG. 4 a recovery of a failed master node is discussed in more detail. In step 1 the master node restarts and registers to the distributor as master node. The recovered node may read previous database contents from disk or previous data file sets including a time stamp from when to start the recovery process.

In step 2 the distributor commands the start of the recovery scenario optionally indicating a time stamp for recovery.

In step 3 the replica nodes simultaneously report updated micro partitions to the master database one by one or several at a time. The parallel upload reduces the recovery time. The full recovery node capacity is used and the load is distributed onto the replica databases which keep attending input traffic. In step 4 the recovered micro partitions are reported in sequence to the distributor. In the embodiment shown in FIG. 4 the dark micro partitions are the micro partitions that are already transmitted to the master.

In step 5 of FIG. 4 the replica nodes and the master node receive the confirmation of the micro partition update. The micro partitions become the master in the master database and are replicated to the replica databases. The replica databases will free the available working memory area space and will start replicating the data onto the disk memory area. This process gradually grows the load on the master node and reduces the load on the replica nodes. As the replica nodes do not play the role of the master node anymore, the working memory area can be freed of the data transmitted to the master. In steps 6-9 the traffic is shown where the replica database still manages the input traffic for not yet recovered micro partitions. Collisions with the input traffic finish the micro partition recovery that is retried afterwards.

When a replica database fails, the traffic is kept undisturbed by the situation and is executed as usual by the active nodes/databases. The main difference can be seen in the fact that all log files accumulate in the master and replicator nodes, as they cannot be transmitted to the replica databases. The log files will be executed later on by the replicator onto the replica databases once the replica database has recovered.

The replica database recovery is similar to the master database recovery described above. The micro partitions from the multiple sources contribute simultaneously and smoothly increase the load on the recovering replica database. Contributors to the recovery process can be the master nodes or other replica databases or a combination thereof. In the worst case scenario and if the log sizes are exceeded in the master and replicator nodes, all mini partitions are recovered by means of a gradual micro partition recovery.

Figure 5:
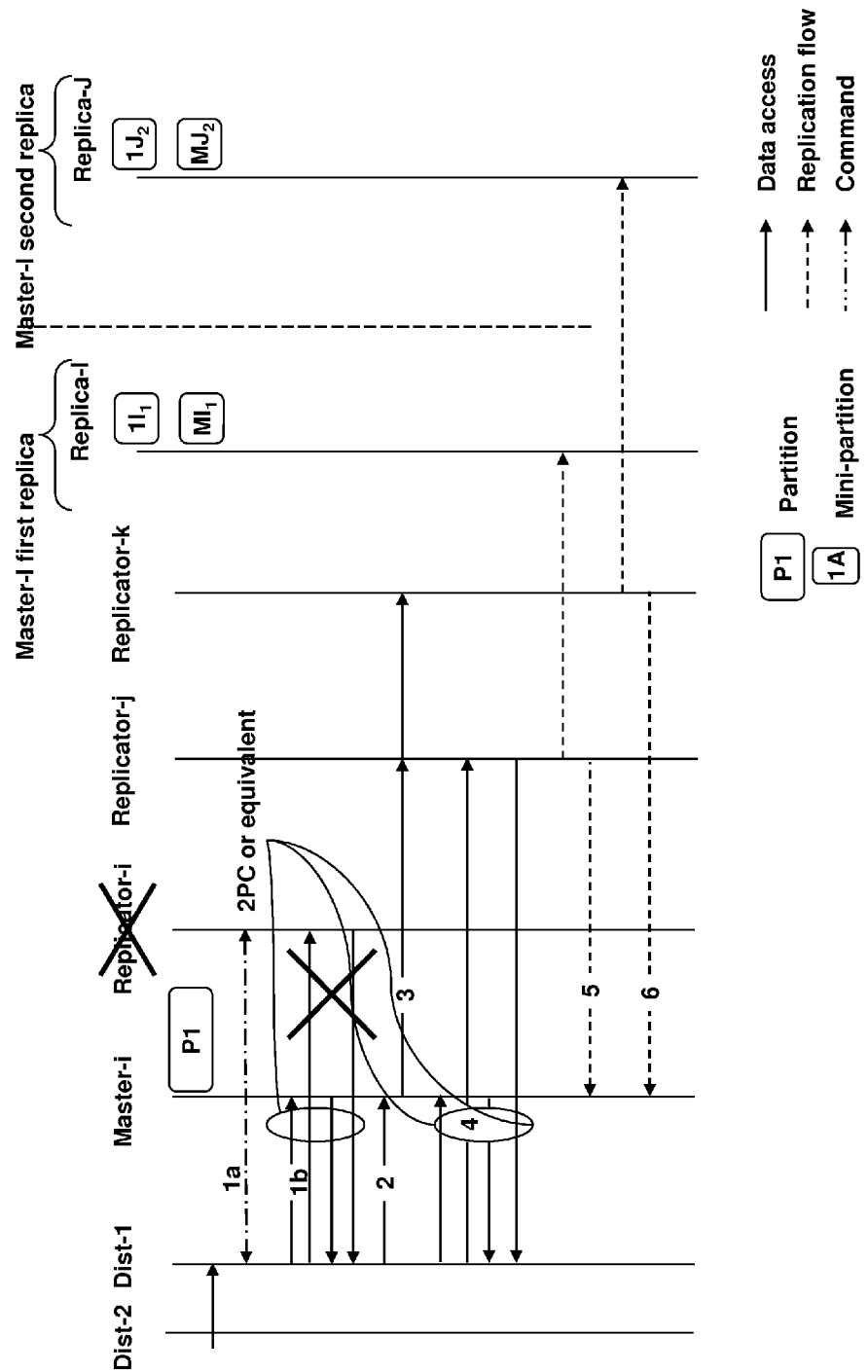
FIG. 5 shows a traffic distribution when a replicator fails and recovers after a failure.

In connection with FIG. 5 a replicator failure and recovery is described.

A replicator failure implies the allocation of micro partitions under failed replicator responsibility to other replicator units. This implies as well recovering log file status for transaction still pending in the affected master nodes.

In the first step shown in FIG. 5 the distributor detects a replicator failure either by actively monitoring or by a two-phase commit failure (steps 1A or 1B). In step 2 the distributor selects a new set of replicators to take the load of the failed one, based on the sharing load of the missing replicator and indicates the changes to the affected master databases.

As shown in step 3 the master databases indicate the pending logged operations to the newly assigned replicators. The replicators take the responsibility for those operations and start applying them as if they were theirs originally.

In step 4 the initially requested operation is executed as in the normal scenario against the newly defined replicator. In step 5 the replication happens and is confirmed for the requested operation. In step 6 those pending logged operations in the master databases are replicated by those replicators which were assigned responsibility for the failed replicator mini partitions.

The failure of a distributor node and the recovery implies the recovering and coordinating distribution and replication allocation status from remaining distributors by learning changes from responses from a master, replicator, replica databases stating their status for data partitions of different levels.

Figure 7:
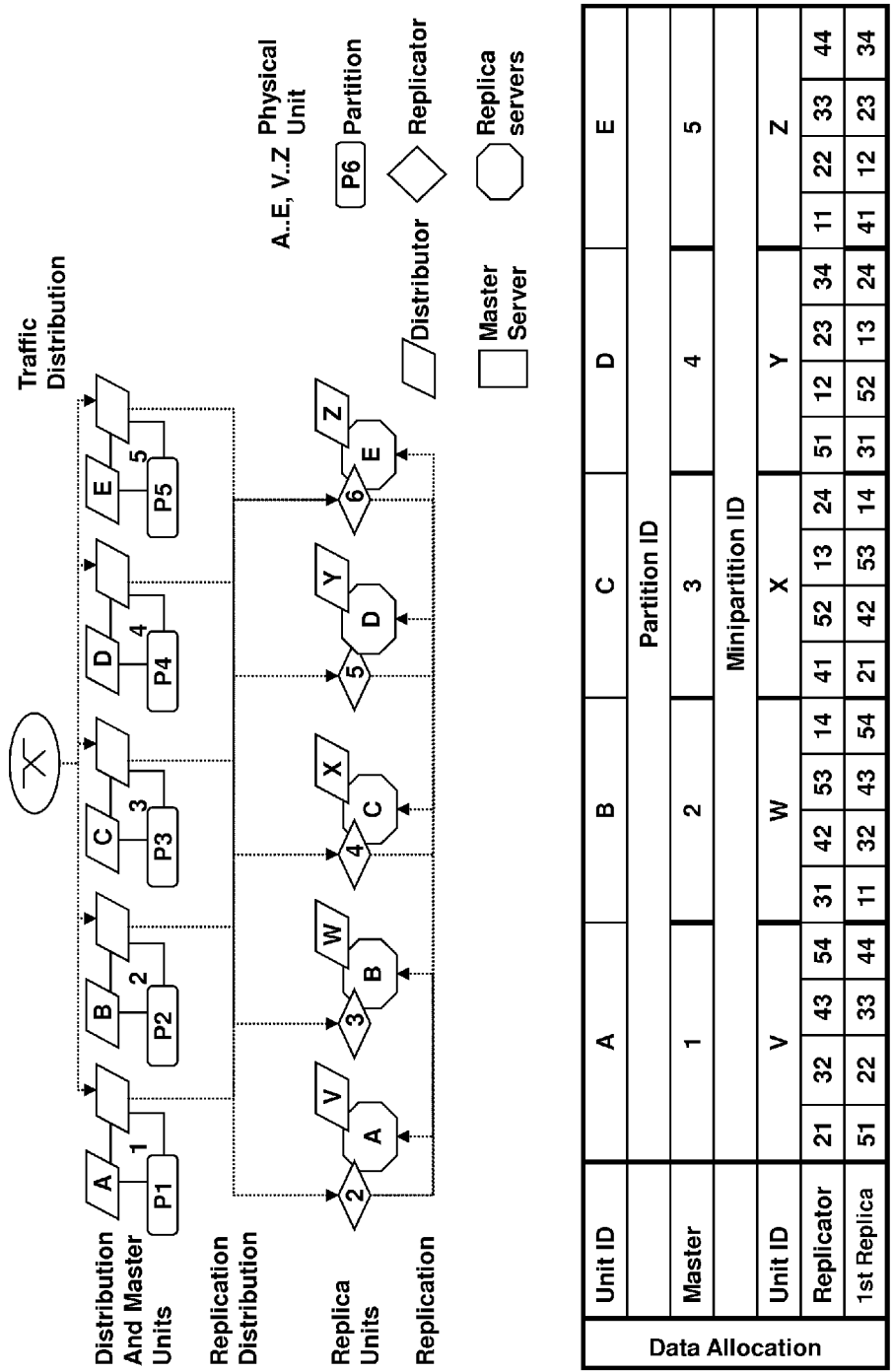
FIG. 7 shows a further embodiment of the real-time database system.
Figure 8:
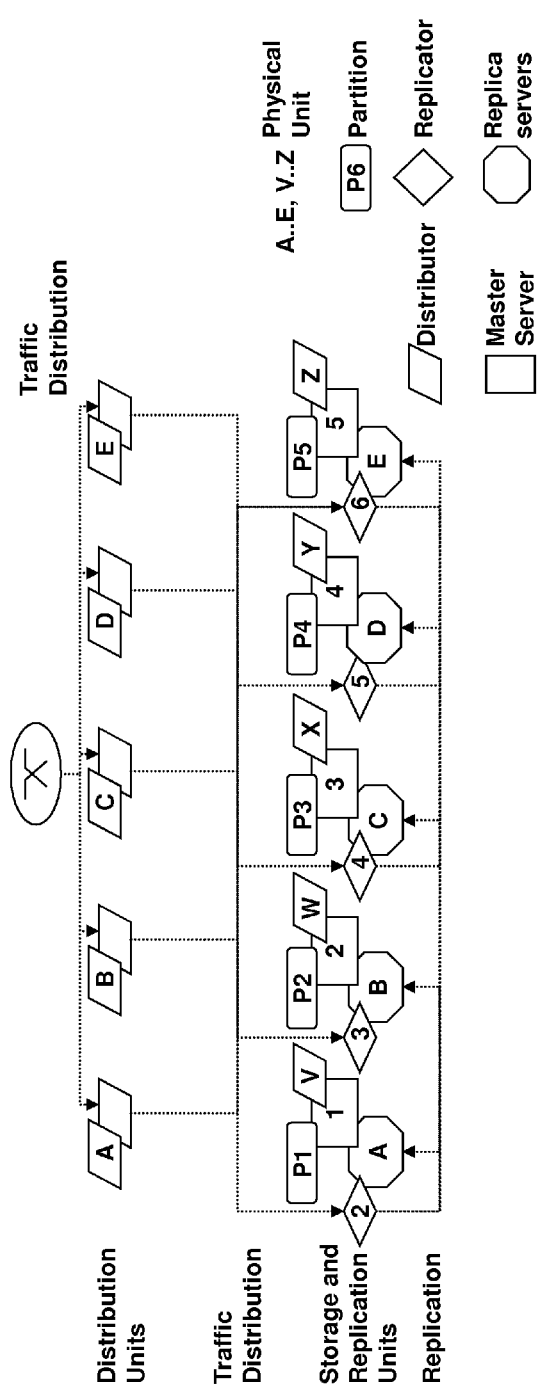
FIG. 8 shows still another embodiment of the real-time database system.

In FIG. 7 another embodiment for the distribution of the different functional entities is shown. In the embodiment shown in FIG. 7 each physical storage unit comprises a distributor, a master database, wherein the system further comprises additional physical storage units comprising each a replicator and a replica database. In the embodiment shown in FIG. 8 a first layer of physical storage units is provided comprising distributors, the system further comprising a second layer of physical storage units comprising the master database, a replicator and the replica database.

The above-discussed invention has the advantage of providing a cluster implementation by a plurality of servers sharing traffic replication, fail over traffic and recovery loads with a complete, fine grain load and capacity control.

The present invention can be based on at least some of the following principles: a) Multi-level data partitioning, b) splitting a database replica onto many storage units, c) the physical storage units share load on all scenarios, so that the idle capacity is reduced, d) having at least two storage units in charge of data objects and updates, e) decoupling the replication from the input traffic, f) the use of hybrid storage units for the replica databases.

Furthermore, the amount of available working memory area for real-time purposes is increased, as the system uses traditional hard disks for replicas. As a consequence, the allover capacity is increased compared to existing solutions. The capacity gain is as well applicable to geographical mirroring, thus adding up additional capacity gains.

A further advantage can be seen in that the recovery times are greatly improved with a complete control of the recovery process. By using multiple replica databases to feed the restarting master databases which simultaneously send recovery operations the load is shared, so that there is a negligible impact on ongoing operations. In view of the short recovery times traditional backups are generally not necessary.

Complementary measures such as log optimization and hybrid data storage for complete or relevant parts of the replicated data are also possible to optimize even more the overall system performance capacity. The operation of replicas in the working memory and on disk is particularly suitable for highly scalable and efficient cluster nodes by using technologies such as flash disks.

The present invention provides a long lasting installation regardless of server hardware evolution by managing small units, micro partitions or sets or them of customizable sizes, so that new servers may be added without disturbance on existing servers.

Furthermore, it is possible to use a linearly scalable architecture where all components can be linearly scaled. Additionally, the invention can be applied to document databases where the micro partitions can be a small and an individual document allowing the complete and efficient resource control in the case of a system failure. Furthermore, an embodiment is provided in which the master slave allocation is defined in terms of micro partitions of any size, i.e. all servers manage micro partitions and replication, failover and recovery processes are all shared among all available servers. Multiple roles in the same server in the homogeneous embodiment as disclosed in FIG. 1 are particularly suitable for multicore CPUs.

It should be noted that partitions, mini partitions and micro partitions are means to structure data and service flows. The invention also applies when such partitions are not explicitly defined as such, but instead data objects are individually allocated following the same schemes, i.e. onto a master database and distributed over multiple replicas so that input traffic, replication traffic and recovery operations are distributed over a set of physical storage units.

By managing the number and sizes of partitions mini partitions and micro partitions, it is possible to deal with environments of heterogeneous servers with different capacities. The scalability of such systems can be managed by allocating new servers and reallocating micro partitions to newly added servers and keeping the properties of load sharing upon server failure while still reducing the idle system capacity to a minimum.

The invention claimed is:

1. A real time database system configured to store database content with a plurality of data sets, the database content being partitioned in different partitions, the system comprising:
   a plurality of master databases, each master database containing a partition of the database content, each partition being provided on a different physical storage unit;
   at least one replica database, each replica database containing subpartitions of the partitions stored in the master databases;
   at least one distributor configured to route a request for a data set to one of the master databases where the data set to which the request refers to is provided, and configured to divide each partition into several subpartitions; and
   at least one replicator configured to generate a replica of each subpartition, and configured to store each replica on the at least one replica database, wherein the at least one replicator stores replicas of each subpartition in such a way that replicas of subpartitions of one partition are contained on different physical storage units, on another physical storage unit other than said one partition, and on a physical storage unit other than the at least one replicator, wherein the at least one distributor is configured to route a replication request for a subpartition to the at least one replicator responsible for said subpartition, wherein the at least one replica database is a hybrid storage unit containing a working memory area and a disk memory area, wherein the working memory area provides faster access to the data sets compared to the disk memory area, the disk memory area containing the replicas of the subpartitions, wherein the hybrid storage unit is configured to move, from the disk memory area to the working memory area of the hybrid storage unit, a replica of a master database for which a failure has been detected, the replica of the failed master database becoming the master database for the failed master database.

2. The real time database system according to claim 1, wherein the at least one distributor is configured to detect a failure of a master database, wherein, when the at least one distributor detects a failure of a master database, the at least one distributor routes requests for data sets contained on the failed master database to replica databases where replicas of the failed master database are provided, the replicas of the failed master database becoming master databases for subpartitions of the failed master database during the failure of the master database.

3. The real time database system according to claim 1, wherein each physical storage unit comprises a distributor, a replicator, a master database and a replica database.

4. The real time database system according to claim 1, wherein each physical storage unit comprises a distributor, a replicator and master database, the system further comprising specialised physical storage units for replica databases.

5. The real time database system according to claim 1, wherein for an update of a data set, the at least one distributor is configured to order a replication of the update to the at least one replicator that generates a replica of a subpartition in which the data set, to which the update refers to, is stored.

6. The real time database system according to claim 1, wherein for an update of a data set, the at least one replicator is configured to log the update and to replicate the update on a corresponding replica database, where the replica of said data set, for which the update is received, is stored.

7. The real time database system according to claim 1, wherein the at least one replica database is configured to further partition a replica of the partition on a replica database into smaller partitions.

8. The real time database system according to claim 7, wherein, when one of the master databases restarts after a failure, the at least one replica database is configured to report the smaller partitions comprising the data sets of the restarted master database needed to recover a partition provided on the restarted master database.

9. The real time database system according to claim 1, wherein the at least one replica database is a hybrid storage unit containing a working memory area and a disk memory area, the disk memory area containing the replicas, and the working memory area containing data sets of the replicas in the disk memory area that are used more often than a predefined threshold.

10. The real time database according to claim 1, wherein the at least one replica database is configured to store replicas from a plurality of master databases.

11. The real time database according to claim 1, wherein the at least one replicator is configured to generate several replicas of each master database, the at least one replicator storing each replica of the several replicas on a different physical storage unit.

12. A method for operating a real time database system storing a database content with a plurality of data sets, the method comprising:
  partitioning the database content into different partitions provided on different master databases, each partition being provided on a different physical storage unit;
  distributing, by at least one distributor, a request for a data set of the database content to one of the master databases where the data set to which the request refers is provided;
  dividing, by the at least one distributor, each partition into several subpartitions; and
  generating, by at least one replicator, a replica of each subpartition, and storing each replica on a replica database, wherein replicas of each subpartition are stored in such a way that replicas of one partition are contained on different physical storage units, on a physical storage unit other than the corresponding partition, and on another physical storage unit other than the at least one replicator, wherein a replication request for a subpartition is routed, by said at least one distributor, to the at least one replicator responsible for said subpartition, wherein replicas of a failed master database are loaded from a disk memory area to a working memory area of a corresponding replica database, wherein the working memory area provides faster access to the data sets compared to the disk memory area.

13. The method according to claim 12, further comprising detecting a failure of the failed master database, wherein, if the failure of the failed master database is detected, requests for data sets contained on the failed master database are distributed by the at least one distributor to replicas of the failed master database, the replicas of the failed master database becoming master databases for subpartitions of the failed master database.

14. The method according to claim 12, wherein, when an update for a dataset of one of the partitions is detected, the update is replicated on a corresponding replica in the replica database.

15. The method according to claim 12, wherein replica databases, the at least one replicator, and one of the master databases are selected by the at least one distributor.

16. The method according to claim 12, wherein an operation log for updates of the database content is distributed by the at least one distributor to one of the master databases and the at least one replicator, the updates being maintained on the master database and on the at least one replicator.

17. The method according to claim 12, wherein, if a master database restarts after a failure, the restarted master database is registered as a master database to the at least one distributor, the restarted master database receiving, from replica databases where replicas of the restarted master database are provided, replicas needed to recover a partition provided on the restarted master database.

18. The method according to claim 17, wherein information about replicas provided to the restarted master database is transmitted to the at least one distributor.

19. The method according to claim 12, wherein, when a failure of a replicator is detected, a new set of replicators is selected, the information about the new set of replicators being transmitted to affected master databases, the affected master databases indicating logged operations to the new set of replicators.

20. The method according to claim 12, wherein, when a failed distributor is recovering, a distribution and allocation status is learned from other distributors of the real time database system.

21. The method according to claim 12, further comprising partitioning each replica on the replica database into smaller partitions.

22. The method according to claim 21, wherein, when a restart of a master database is detected, the smaller partitions comprising data sets of the restarted master database needed to recover a partition provided on the restarted master database are transmitted to the restarted master database to update the restarted master database.

23. The method according to claim 22, wherein smaller partitions transmitted to the restarted master database are reported to the at least one distributor for the at least one distributor to route data and update requests to the restarted master database if any data set affected by the update requests has already been transmitted to restarted master database, or else route data and the update requests to the replica database if any data set affected by the update requests has not yet been transmitted to restarted master database.

24. The method according to claim 21, wherein, when the replica database restarts after a failure, the smaller partitions provided on other replica databases and/or the master database needed to recover a subpartition provided on the restarted replica database are transmitted to the restarted replica database to update the restarted replica database.

* * * * *